United States Patent
Keivanloo et al.

(10) Patent No.: US 11,704,318 B1
(45) Date of Patent: Jul. 18, 2023

(54) MICRO-PARTITIONING BASED SEARCH

(71) Applicant: A9.Com, Inc., Seattle, WA (US)

(72) Inventors: Iman Keivanloo, Seattle, WA (US);
Trishul Amit Madhukar Chilimbi, Seattle, WA (US); Narayanan Sadagopan, Fremont, CA (US); Choon Hui Teo, Milpitas, CA (US); Santosh Rajagopalan, San Jose, CA (US); Hyokun Yun, Redmond, WA (US); Vishwanathan Swaminathan, Saratoga, CA (US); Sankalp Nayak, San Jose, CA (US)

(73) Assignee: A9.COM, INC., Palo Alto, CA (US)

(*) Notice: Subject to any disclaimer, the term of this patent is extended or adjusted under 35 U.S.C. 154(b) by 183 days.

(21) Appl. No.: 16/900,592

(22) Filed: Jun. 12, 2020

(51) Int. Cl.
  *G06F 16/2455* (2019.01)
  *G06F 16/248* (2019.01)
  *G06Q 30/06* (2023.01)
  *G06N 20/00* (2019.01)

(52) U.S. Cl.
  CPC ........ *G06F 16/24554* (2019.01); *G06F 16/248* (2019.01); *G06N 20/00* (2019.01); *G06Q 30/0603* (2013.01); *G06Q 30/0627* (2013.01)

(58) Field of Classification Search
  CPC ... G06N 20/00; G06F 16/248; G06Q 30/0627; G06F 16/24554; G06Q 30/0629; G06Q 30/0603
  See application file for complete search history.

(56) References Cited

U.S. PATENT DOCUMENTS

| | | | | |
|---|---|---|---|---|
| 9,720,934 | B1* | 8/2017 | Dube et al. | G06F 18/24 707/737 |
| 10,109,051 | B1* | 10/2018 | Natesh et al. | G06V 10/56 707/739 |
| 10,616,338 | B1* | 4/2020 | Gupta et al. | G06F 16/2237 707/739 |
| 2003/0004932 | A1* | 1/2003 | Chow et al. | G06F 16/954 707/739 |
| 2015/0154192 | A1* | 6/2015 | Lysne et al. | G06N 5/00 707/758 |
| 2016/0042053 | A1* | 2/2016 | De Sousa Webber | G06F 16/35 707/739 |
| 2016/0042253 | A1* | 2/2016 | Sawhney et al. | G06F 16/50 382/190 |
| 2019/0179858 | A1* | 6/2019 | Douze et al. | G06F 16/90335 707/739 |
| 2020/0042642 | A1* | 2/2020 | Bakis et al. | G06F 40/35 707/737 |
| 2021/0256006 | A1* | 8/2021 | Zhang et al. | G06F 16/244 707/999.003 |
| 2022/0019585 | A1* | 1/2022 | Beresniewicz | G06F 16/212 707/737 |

* cited by examiner

*Primary Examiner* — Yuk Ting Choi
(74) *Attorney, Agent, or Firm* — K&L Gates LLP

(57) ABSTRACT

Devices and techniques are generally described for search using a micro-partitioned catalog. In some examples, a search system can determine a plurality of items in an online catalog. The search system can generate a similarity graph based on vector representations of the plurality of items and determine an item as a representative item for a cluster of items. The search system can receive a query and determine the cluster of items as a candidate cluster based on a comparison between the query and the representative item. The search system can determine a candidate item of the cluster of items based on a comparison between the query and the cluster of items.

20 Claims, 7 Drawing Sheets

MICRO-PARTITIONING BASED SEARCH

BACKGROUND

A user can browse an online catalog and search for items available for order. In some instances, the user can input a query to search for a specific item or related items. In some instances, the online catalog can include a large number of items. Determining relevant search results based on the query can consume a significant amount of computational resources and require an amount of time that can result in a disappointing and/or frustrating user experience.

DETAILED DESCRIPTION

Figure 1:
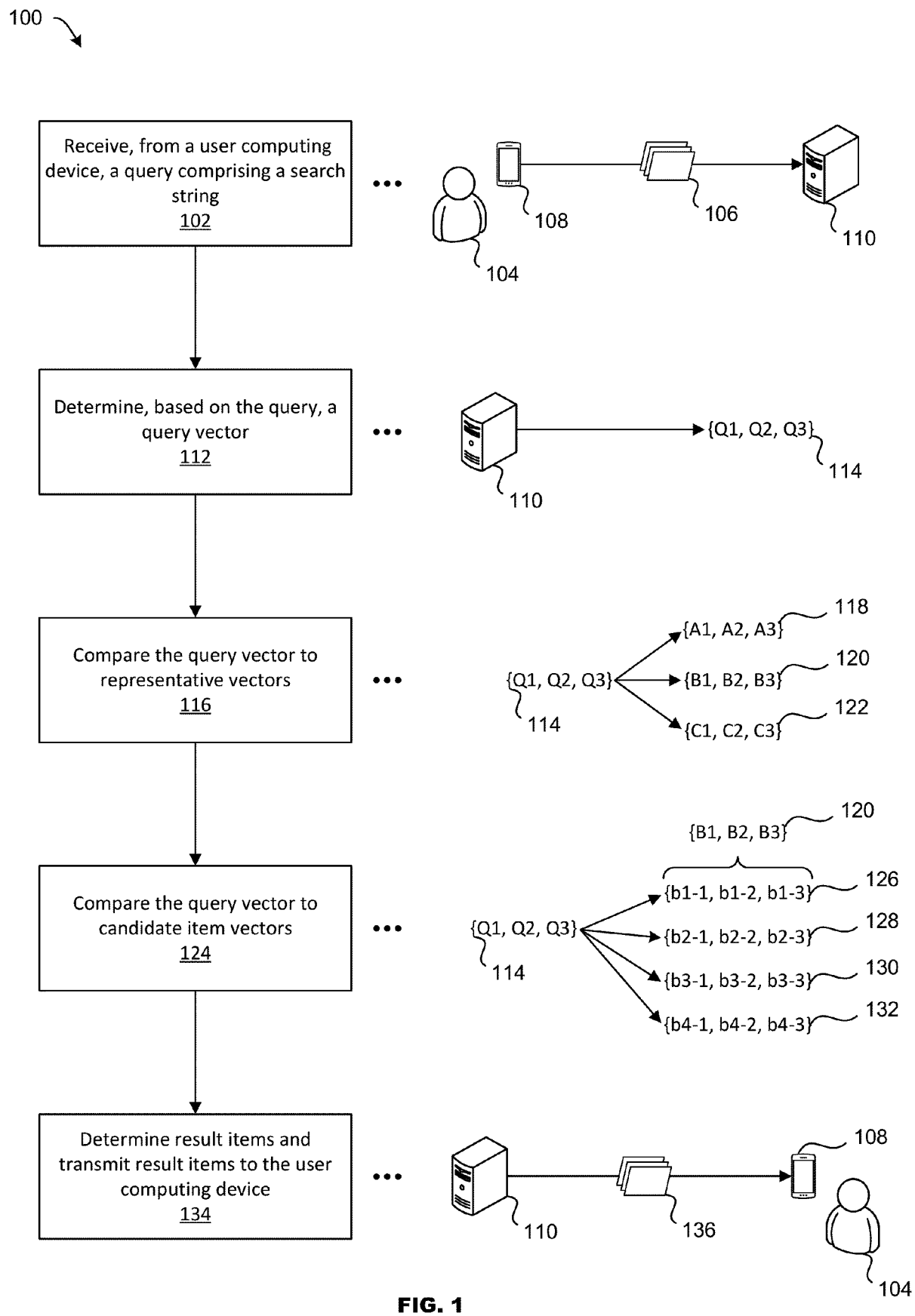
FIG. 1 is a pictorial flow diagram of an example process for receiving a query, determining search results, and providing the search results to a user.

In the following description, reference is made to the accompanying drawings that illustrate several examples of the present disclosure. It is understood that other examples may be utilized and various operational changes may be made without departing from the scope of the present disclosure. The following detailed description is not to be taken in a limiting sense, and the scope of the embodiments of the present disclosure is defined only by the claims of the issued patent.

As online shopping has become an increasingly important part of the daily lives of individuals, sustainable growth of the product search services calls for control of the infrastructure cost while maintaining the same quality of service to the user. The growth of e-commerce continues to be accompanied by the growth of the cost to host the product search engine, as more products are indexed and more queries are issued by the customer. For example, an online catalog of items can contain billions of products. One challenge related to managing a large catalog relates to providing relevant search results in a timely and efficient manner to users searching the catalog. Using semantic search, a user can query the catalog and a search system can compare the semantic representation of the query with each item in the catalog. The search system can then rank the items according to a similarity score and provide the most relevant (e.g., the most similar) items to the user. However, comparing the query to each item in the catalog can be computationally expensive and take a significant amount of time. Additionally, while discussed in the context of items and a catalog of items (such as a product catalog), the items can include digital or physical items. By way of example and without limitation, the items can be content items including digital content items (e.g., videos, audio tracks, digital books, advertisements, and the like).

In some embodiments, the catalog of items can be preprocessed and represented as a similarity graph. For example, using a similarity function, such as cosine similarity (although any suitable function may be used in accordance with the embodiments described herein), a search system can determine a similarity graph that represents the catalog of items, or a portion thereof. In some instances, the similarity graph can be a nearest neighbor graph or a k-nearest neighbor graph, although other suitable similarity graphs are contemplated. The similarity function can compare vector representations of items to determine the similarity. The similarity graph can be determined using the similarity function and a similarity threshold. If a similarity value, as a result of the comparison using the similarity graph, meets or exceeds a similarity threshold, the items may be connected in the similarity graph.

After determining a similarity graph that represents the catalog of items (and/or a portion thereof), the search system can identify representative items (also referred to as "supernodes") in the similarity graph. A selection algorithm can be used to identify the representative items. For example, the selection algorithm can first identify a first item that has a maximum number of items connected to the first item. The selection algorithm may associate the items connected to the representative item with a first cluster. Based on the items connected to the representative item, the selection algorithm can identify a second item that has a maximum number of items connected to the representative item that are not already associated with a cluster. Based on the items connected to the representative item that are not already associated with a cluster, the selection algorithm may associate the items connected to the representative item with a second cluster.

A user can use one or more computing devices to submit a query to the search system. In some instances, the user can submit the query over a network (e.g., the Internet) to the search system. Based on the query, the search system can determine a vector representation of the query. The query can originally be, for example, in a lexical representation. In natural language processing (NLP) a token refers to an instance of a sequence of characters in a document or input text that are grouped together as a useful semantic input for processing. If each dimension of the input feature vector represents the presence of a token in the query, and f is the identify function, then the model is essentially performing logistic regression jointly for all the labels (e.g., all the label data). Deep learning has demonstrated effectiveness in natural language processing tasks. As such, models typically used in natural language processing tasks such as recurrent neural networks (RNN) and/or transformer networks may be used in the design of f(x). However, while such models are better at modeling the dependency among tokens, performance gains may be achieved at the expense of high computation cost. When the input query often consists of a few tokens and does not resemble a complete natural language sentence (e.g., in the typical product search context), high model capacity may be unnecessary to achieve high performance for the product search shard classification task. Additionally, relatively small and shallow feed-forward networks can achieve good performance in NLP tasks with high efficiency in training and inference relative to RNNs, long short term memory models (LSTMs), and/or transformer-based models. Advantageously, smaller and more shallow feed-forward networks may reduce overall training time, as the depth of back propagation is reduced when fewer layers are used.

Advantageously, the techniques described herein are agnostic to language. Accordingly, a model may be trained using a dataset in any desired language. As such, a set of models may be deployed, one for each language, in order to ensure per-query semantic understanding for search queries of different languages.

The query may be input into a machine-learned model trained to output feature vectors that are numerical representations of the input. Although, in some instances, a rule-based system can be used to generate and/or output feature vectors. For example, a rule-based system can receive the query and, based on rules that assign numerical values to text, determine a vector comprising numerical values that comprise the vector representation of the query.

Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

After determining the vector representation of the query, the search system can compare the vector representation of the query to the vector representations of the representative items. In some instances, the search system can use a similarity function to determine a similarity value indicating a similarity between the query and the representative items.

The search system can compare the vector representation of the query to the vector representations of the items in the cluster associated with the representative item. Based on the comparison, the search system can determine similarity values associated with the items in the cluster The search system can determine result items based on the comparison between the vector representation of the query and the items in the cluster. For example, a similarity function can determine the similarity, represented by a similarity value, between the item items in the cluster. In various examples, if the similarity values associated with the items in the cluster meet or exceed the similarity threshold (and/or otherwise compare favorably to the similarity threshold), the search system can include those items in the result items transmit the result items back to the computing device associated with the user.

The ability to generate relevant search results for items from a large catalog presents several technical challenges. One challenge, for example, relates to providing search results within a timely manner. For a significantly large catalog, generating relevant search results often includes comparing a query to a large number of items to determine relevant results. When a catalog includes billions of items, it can be technically challenging to perform the comparisons necessary to provide timely and relevant search results because comparing the query to all items or even a majority of the items in the catalog will take an amount of time that users may not be willing to wait for.

Conversely, performing the number of comparisons required in a timely manner can present another technical challenge. Specifically, maintaining sufficient availability of computational resources. Users may conduct many queries, potentially resulting in consumption of a significant amount of computational resources (processing resources, memory resources, network resources, etc.) in order to provide timely results.

To address these problems, the micro-partitioned based search system described herein can perform a user query and compare the query to a subset of items to determine an initial relevance. Based on the initial relevance, the micro-partitioned based search system can continue to perform additional comparisons to reduce the amount of total comparisons while increasing the likelihood of producing relevant results for the user and therefore improving the overall user experience.

Additionally, the techniques discussed herein can improve a functioning of a computing device by decreasing the amount of computing resources consumed. By reducing the number of comparisons, the micro-partitioned based search system can use less processing resources, consume less energy, and produce relevant results to the user, which can, in some instances, reduce the likelihood of additional queries by the user. Therefore, the functioning of a computing device can be increased by reducing the resources consumed by reducing a number of comparisons and generating more relevant results to users.

FIG. 1 is a pictorial flow diagram of an example process 100 for receiving a query, determining search results, and providing the search results to a user. Some portions of example process 100 can be omitted, replaced, and/or reordered while still providing the functionality of determining search results and providing the search results to a user.

At operation 102, a user 104 (e.g., a user searching an online catalog for a product) can provide a query 106 through a user computing device 108 (e.g., a desktop computing device, a mobile computing device, etc.). In many of the examples provided herein, a user searching for a product via an online retailer's search system is described. However, it should be appreciated that the techniques described herein are broadly applicable to other search domains beyond the product search context. For example, the techniques described herein can be used to search for different types of items and/or data within various catalogs and/or databases. By way of example and without limitation, the techniques described herein can be used to search for media items (e.g., images, music, movies, television shows, or advertisements) in a media item database. In some instances, the techniques described herein can be used to search for other types of data such as documents, web pages, map locations within a mapping service, and/or text available on the Internet, and the like. However, in some examples, the techniques described herein may offer particular advantages for search domains where the corpus data has relatively little associated text beyond taxonomy and/or category data (e.g., such as in product databases).

As discussed above, the user 104 can use user computing device 108 to submit a query 106. In some instances, the user 104 can submit the query 106 over a network to a remote computing device 110 (also referred to as the search system). In various examples, the network can be a wide area network, such as the Internet, while in other embodiments, the network can be a local area network (LAN) over which search queries are sent and search results are returned. In some further embodiments, the network can be a combination of the Internet and a LAN. In some instances, search system 110 can be a distributed search system and can have one or more server instances. The server instances can be virtualized server instances executing on one or more physical machines. In some examples, components of the server instances may be executed on one or more different physical machines (e.g., using a container-based architecture) to provide server functionality in a decentralized computing environment. In some other examples, one or more of the server instances can represent a physical machine.

At operation 112, the process 100 can include determining, based on the query 106, a query vector 114 at the search system 110. The search system 110 can receive, for example, a lexical representation of the query 106. By way of example and without limitation, the query 106 can include the words "running shoes." In some instances, the query 106 can be input into a machine-learned model trained to output feature vectors that are numerical representations of the input. For example, the machine-learned model can be trained using historical purchase data. The historical purchase data can include queries provided by users of the search system 110. Additionally, the historical purchase data can include the items that the users selected or viewed following the query, which can be used as ground truth data. By inputting historical purchase data, including the ground truth data, as training data into the machine-learned model, the machine-learned model can be trained to output feature vectors that numerically represent the query 106 as the query vector 114. In some instances, a rule-based system can be used to output feature vectors. For example, a rule-based system can receive the query 106 and, based on rules that assign numerical values to text, determine a vector comprising numerical values that represent the query 106 as query vector 114

At operation 116, the process 100 can compare the query vector 114 to representative vector(s) 118-122. The representative vectors 118-122 can be vectors associated with items that represent a cluster of items. For example, items in a catalog of items can be associated with vector representations of those items. Using a similarity function, such as cosine similarity, Euclidean distance, etc., a similarity graph can be determined. In some instances, the similarity graph can be a nearest neighbor graph or a k-nearest neighbor graph, although other suitable similarity graphs are contemplated. A similarity graph can graphically represent relationships between nodes. By way of example and without limitation, items of an online catalog can represent nodes of the graph. Nodes of the similarity graph can be connected based on a similarity relationship between nodes. In some instances, the similarity graph can be determined using the similarity function and a similarity threshold. If a similarity value, as a result of the comparison using the similarity graph, meets or exceeds a similarity threshold, the items can be connected in the similarity graph.

The representative items can be determined by using a selection algorithm. The representative items can be items (e.g., nodes) in the similarity graph that are connected to number of other items. By way of example and without limitation, the selection algorithm (e.g., a clustering function), at a first iteration, can begin by selecting a first item that has a maximum number of items connected to the first item and determine a cluster that includes the items connected to the first item. At a second iteration, the selection algorithm can select a second item that has the maximum number of items connected to the second item that are not already in a cluster and determine a cluster that includes the items connected to the second item. In some instances, the selection algorithm can select the first item and/or the second item, and subsequent items, based on a threshold instead of a maximum number where if the number of items connected to the selected item meets or exceeds a connected items threshold, the selection algorithm can determine a cluster. The selection algorithm can continue to operate until all of the items in the catalog are included in a cluster and, in turn, associated with a representative item. In some instances, the selection algorithm can continue to operate until a threshold number or percentage of items in the catalog are included in a cluster.

By way of example and without limitation, the similarity graph can graphically represent the items available in the catalog and the relationships between the items. For example, and as discussed above, items can be represented as nodes in the similarity graph. The items can be connected when the similarity between items meets or exceeds a similarity threshold. Using a selection algorithm, an item in the similarity graph can be determined to be a representative item (e.g., a supernode) based on the number of items connected to the representative item. As an illustrative example, an item can be connected to thirty other items based on the item's similarity with the thirty other items. The selection algorithm can identify the item as a representative item based on the number of connection (e.g., thirty) being the maximum number of connections that an item has in the similarity graph or the number of connections meeting or exceeding a connection threshold. Based on the connections, the items connected to the representative item can be clustered into a single cluster. The selection algorithm can continue to determine additional representative items and additional clusters can be determined until all of the items in the similarity graph are associated with a cluster. Therefore the similarity graph can be represented as a set of clusters where each cluster is associated with a representative item. A search system, like search system 110, can compare the query to the representative items and, based on the similarity of the query to the representative times, can determine clusters that are similar to the query. This can reduce a number of comparisons by initially determining clusters of items that are similar to the item rather than comparing the query to all items in the catalog. Based on the similar clusters, the search system, like search system 110, can perform additional comparisons with the items associated with the similar clusters and omitting comparisons with the items associated with less similar clusters.

As discussed above, at operation 116, the process 100 can compare the query vector 114 to representative vector(s) 118-122. Because the representative items are representative of the cluster of items, and because the items of the cluster are, individually, semantically similar to one another, a comparison of the query vector 114 to the representative vector(s) 118-122 can be used as an approximation for how relevant the cluster of items is to the query. In some instances, the process 100 can use a similarity function to determine a similarity value indicating a similarity between the query vector 114 a representative vector of the representative vector(s) 118-122. By way of example and without limitation, operation 116 can result in the query vector 114 having a greater similarity value with respect to representative vector 120 than representative vectors 118 or 122.

At operation 124, the process 100 can compare the query vector 114 to candidate item vector(s) 126-132. The candidate item vector(s) 126-132 can be vectors associated with items within a cluster that is represented by one of representative vector(s) 118-122 (e.g., candidate representative vectors). By way of example and without limitation, the representative vector 120 can be connected, in the similarity graph, candidate item vector(s) 126-132. Based on the selection algorithm, the candidate item vector(s) 126-132 can be clustered together into a cluster that is associated with the representative vector 120. As discussed above, operation 116 can indicate that the query vector 114 has a greater similarity value with respect to representative vector 120 than compared to representative vectors 118 or 122. The process 100 can continue by determining a similarity value, using a similarity function, with the candidate item vectors 126-132.

At operation 134, the process 100 can proceed by determining the result items based on the comparison between the query vector 114 and the candidate item vectors 126-132. For example, a similarity function can determine the similarity, represented by a similarity value, between the query vector 114 and the candidate item vectors 126-132. In some instances, the process 100 can use a similarity threshold to determine whether the candidate item vectors 126-132 meet or exceed the similarity threshold. If the similarity values associated with the candidate item vectors 126-132 meet or exceed the similarity threshold, the search system 110 can include the items associated with the candidate item vectors in the result items 136 and transmit the result items 136 to the user computing device 108 associated with the user 104.

Figure 2:
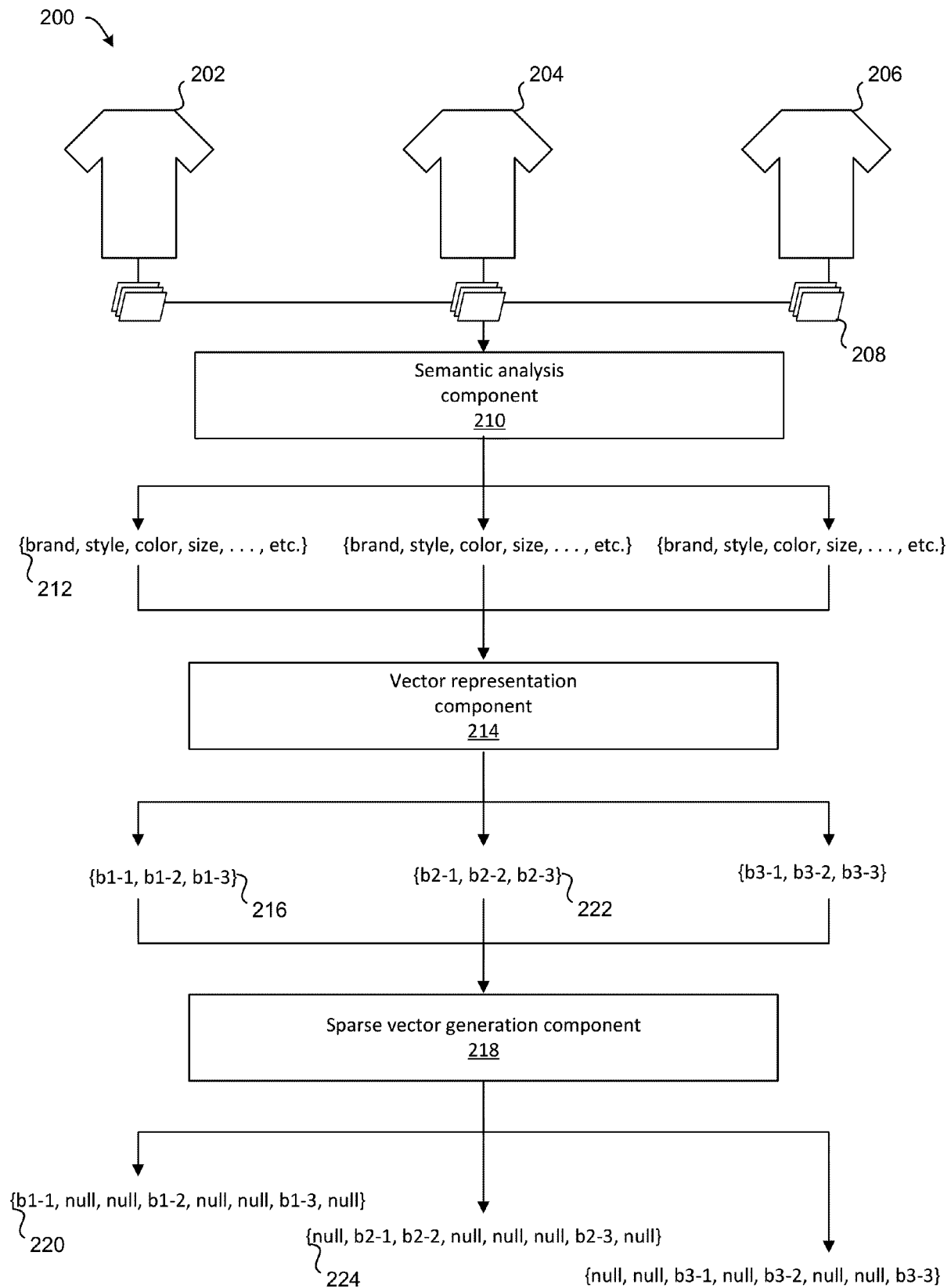
FIG. 2 is a diagram illustrating an example process for determining sparse vector representations of items in an online catalog.

FIG. 2 is a diagram 200 illustrating an example process for determining sparse vector representations of items in an online catalog. Items 202-206 can represent items for sale in an online catalog. By way of example and without limitation, the items 202-206 can be articles of clothing including shirts in various colors. When the items 202-206 are placed into the catalog, the items 202-206 can be associated with catalog data 208 that describe the items 202-206. For example, the catalog data 208 can be provided by a manufacturer of the items 202-206 and may include descriptions of the items 202-206. By way of example and without limitation, the description can include brand data, color data, size data, fit data, style data, and the like. In some instances, the catalog data 208 can be provided by a distributor of the items 202-206 or a retailer.

The catalog data 208 can be input into a semantic analysis component 210. The semantic analysis component 210 can use, for example, natural language processing techniques to determining the meaning of the text based on the individual words, phrases, and/or metadata associated with the catalog data 208. In some instances, the semantic analysis component 210 can use a language model and/or a grammar database to determine and extract features into a semantic vector 212. The semantic vector 212 can represent the semantic interpretation of the catalog data 208 as provided by the semantic analysis component 210. Using the semantic vector 212, a vector representation component 214 can determine vector representation 216, which can be a numeric value comprising a numerical representation of one of the items 202-206. In some instances, the semantic vector 212 can comprise tokens such as character-level token data and/or word-level token data). By way of example and without limitation, the vector representation 216 can include 256 floating point numerical values each with a range of -1 to 1. However, other suitable ranges and total number of numerical values are contemplated. By way of example and without limitation, the vector representation 216 can include more or fewer numerical values including floating point, integer, rational, and/or irrational numerical values. Additionally, the range of the numerical values can include positive, negative, numbers greater than or equal to 1, and/or numbers less than or equal to -1.

The vector representation 216 can be input into a sparse vector generation component 218 which can generate a sparse vector representation 220. As discussed above, the vector representation component 214 can generate a vector representation 216 of one of the items 202-206. By way of example and without limitation, the vector representation for item 202 can be different and include different features than the vector representation for item 204. For example, the vector representation component 214 can determine a vector representation 216 that is associated with item 202. Additionally, the vector representation component 214 can determine a vector representation 222 that is associated with item 204. As shown in FIG. 2, the vector representation 216 can include features b1-1, b1-2, and b1-3 and the vector representation 222 can include features b2-1, b2-2, and b2-3. As discussed above, each of these features can be numerical values that, as a vector, describe the corresponding item.

In some instances, a numerical value in one vector representation can be associated with a feature that is not applicable to a feature of a different vector representation. By way of example and without limitation, in the vector representation 216, the feature associated with b1-1 may not have an equivalent to any feature in the vector representation 222. However, in the vector representation 216, the feature associated with b1-3 can have an equivalent to the feature associated with b2-3. For numerical values without an equivalent, the sparse vector generation component 218 can expand the vector representation and insert a null value. Therefore, the resulting sparse vector representation associated with one item can include the same number of dimensions as another sparse vector representation associated with a different item and ease the comparison between sparse vector representations.

Additionally, while FIG. 2 depicts the features in the vector representations 216 and 222 (e.g., b1-1, b1-2, etc.) as the same features in the sparse vector representations 220 and 224. In some instances, the numeric values represented in the vector representations 216 and 222 can be the same numeric values represented in the sparse vector representations 220 and 224. In some instances, the numeric values represented in the vector representations 216 and 222 can be different from the numeric values represented in the sparse vector representations 220 and 224. By way of example and without limitation, the sparse vector generation component 218 can perform operations on the vector representations 216 and 222 and determine sparse vector representations 220 and 224 that include numerical values that differ from the numerical values in the vector representations 216 and 222. In some instances, the sparse vector generation component 218 can be a rule-based system or a machine-learned model trained to output the sparse vector representations 220 and 224.

By way of example and without limitation, as shown in FIG. 2, the sparse vector representation 220 shows the b1-1 value in the first dimension and the sparse vector representation 224 shows a null value in the first dimension. Additionally, the sparse vector representation 220 shows the b1-3 value in the first dimension and the sparse vector representation 224 shows a b2-3 value in the seventh dimension. Therefore, the sparse vector generation component 218 can expand the vector representations 216 and 222 to generate sparse vector representations 220 and 224 which can include comparable dimensions. In some instances, a 0 can be used rather than a null value.

Figure 3:
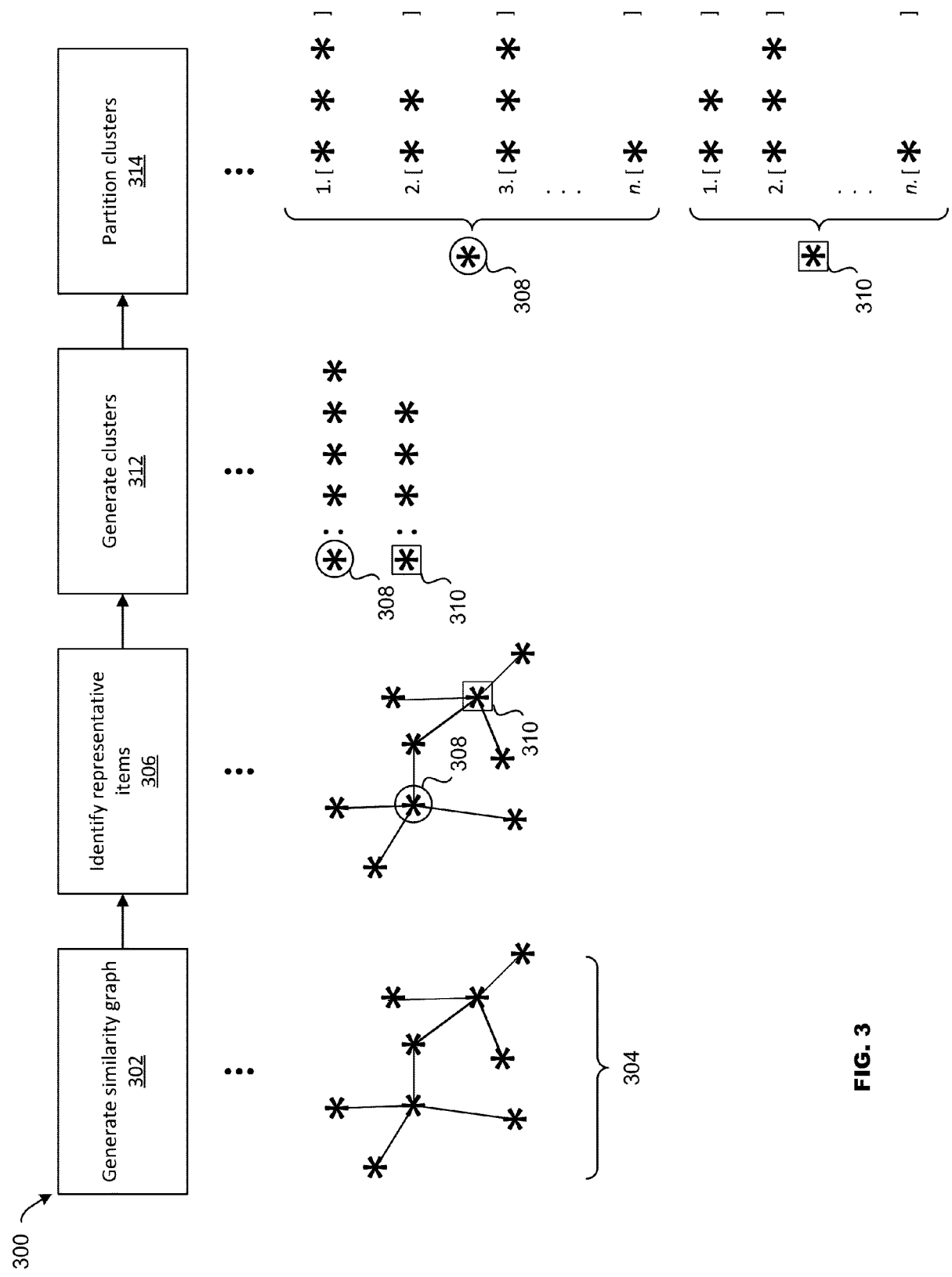
FIG. 3 is a pictorial flow diagram of an example process for determining clusters of items and partitions within a cluster based on vector representations of the items.

FIG. 3 is a pictorial flow diagram of an example process 300 for determining clusters of items and partitions (also referred to as micro-partitions) within a cluster based on vector representations of the items. As shown in FIG. 3, an asterisk (i.e., *) can represent a single vector representation of an item in a catalog of items. The vector representation can be a vector of numerical values that represent an item in a feature space. Lines connecting one asterisk with another asterisk can indicate that the two asterisks have a similarity value that meets or exceeds a similarity threshold. At operation 302, a similarity function can be used to determine the similarities between items in a catalog. In some instances, the similarity function can compare vector representations of the items and connect items whose similarity value meets or exceeds a similarity threshold. The connection between items can be represented as similarity graph 304. Accordingly, the similarity function generates similarity graphs whereby similar items are connected to one another.

At operation 306, the example process 300 can identify representative items in the similarity graph 304. A selection algorithm can be used to identify the representative items 308 and 310. For example, the selection algorithm can first identify a first item that has a maximum number of items connected to the first item. The selection algorithm can associate the items connected to the representative item 308 with a first cluster. The first item can be item 308. In some instances, the selection algorithm can identify a second item that has a maximum number of items connected to the representative item 310 that are not associated with a cluster. Based on the items connected to representative item 310, the selection algorithm can associate the items connected to representative item 310 with a second cluster. The representative items represent the similarity graph with which they are associated, as described above.

At operation 312, the example process 300 can generate the cluster based on the results of the selection algorithm. By way of example and without limitation, each of the items in the similarity graph 304 can be associated with a cluster and operation 312 can restructure the similarity graph 304 to represent the items as items associated with representative items 308 and 310.

At operation 314, the example process 300 can partition the clusters based on features associated with sparse vector representations of the items. By way of example and without limitation, each item can be associated with a sparse vector representation of that item. The cluster associated with the representative item 308 can be partitioned based on the dimensions of the sparse vector representation. For the first dimension, each item that has a value that is not null (or non-zero) for the first dimension can be partitioned and associated with the first dimension. For the second dimension, each item that has a value that is not null (or non-zero) for the second dimension can be partitioned and associated with the second dimension. This can continue for each dimension through the n-th dimension within the cluster associated with the representative item 308. The same partitioning can be done for the representative item 310. Additional detail regarding partitioning clusters is described below in reference to FIG. 4.

Figure 4:
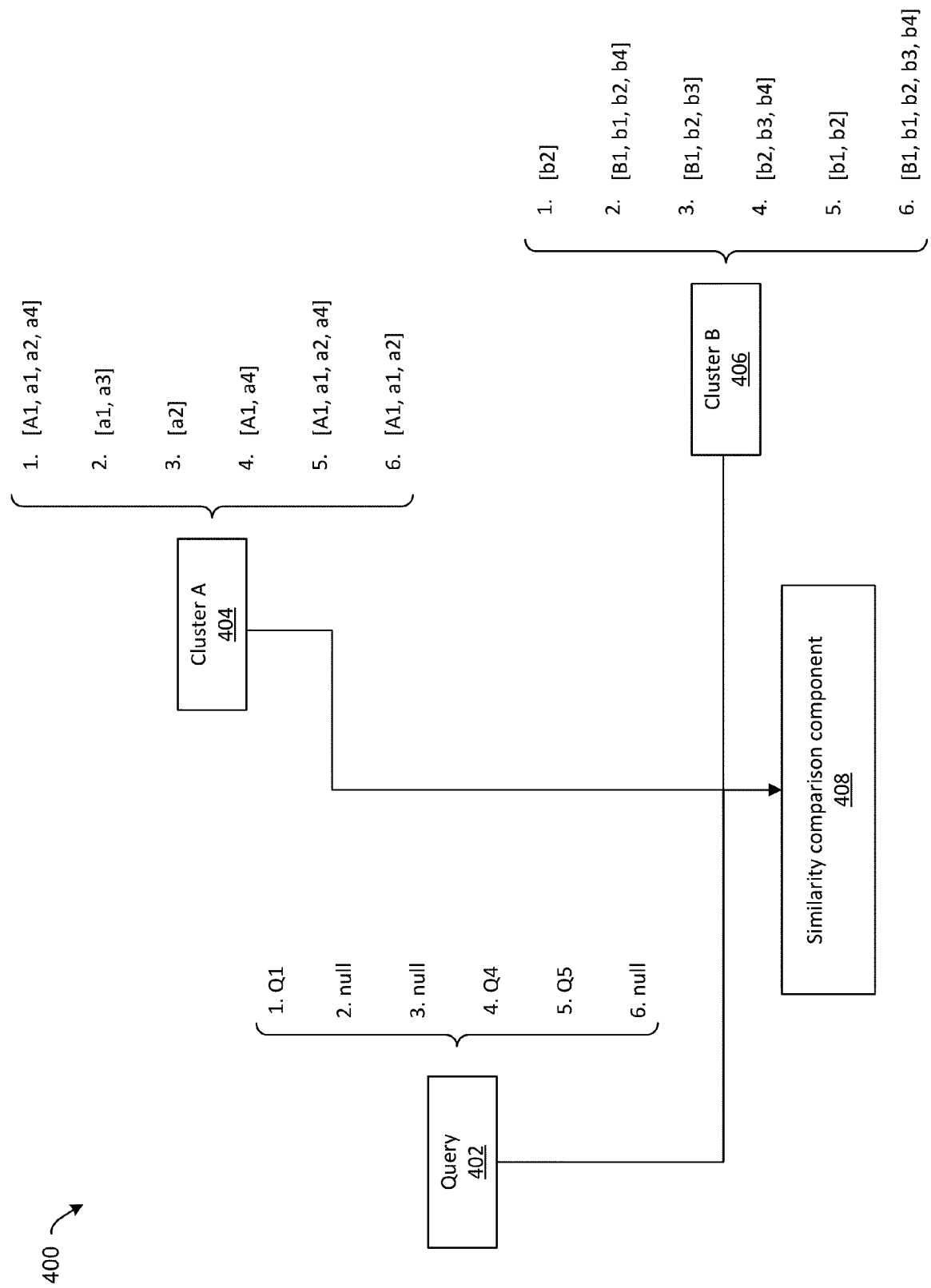
FIG. 4 is a diagram illustrating a comparison of a vector representation of a query and clusters of items.

FIG. 4 is a diagram 400 illustrating a comparison of a sparse vector representations of a query and clusters of items. Query 402 can be can be a sparse vector representation of a query with values Q1, Q4, and Q5 associated with the first, fourth, and fifth dimensions of the sparse representation vector with null values associated with the other dimensions in the sparse representation vector. The query 402 can, by way of example and without limitation, represent a query submitted by a user via computing device to search an online catalog of items. Additionally, cluster A 404 can be associated with a representative item, A1 and candidate items a1, a2, a3, and a4 can be items connected to the representative item in the similarity graph that were clustered together based on a similarity with the representative item.

The representative item A1 and items a1-a4 can be partitioned based on the non-null dimensions of their sparse vector representations. For example, item a1 can have numerical values associated with the first, second, fifth, and sixth dimensions of the sparse vector representation and is therefore partitioned into those dimensions in cluster A. However, item a1 may not have numerical values associated with the third and fourth dimensions of the sparse vector representation and is therefore not partitioned into those dimensions in cluster A.

The same partitioning can be done for cluster B 406. The similarity comparison component 408 can determine a similarity between the query 402 and the representative items A1 and B1. By way of example and without limitation, A1 can have numerical values associated with the first, fourth, and fifth dimensions and B1 can have numerical values associated with the second, third, and sixth dimensions. Based on the similarity values provided by a similarity function between the query 402 and A1 and between the query 402 and B1, the similarity comparison component 408 can determine that the query has a similarity value that meets or exceeds a similarity threshold with respect to A1 but not with B1. Based on the similarity between the query 402 and A1, the similarity comparison component 408 can use a similarity function to determine the similarity between the query 402 and each of the items associated with cluster A 404.

In some instances, the similarity comparison component 408 can reduce the number of comparisons required by omitting comparisons between items that are associated with dimensions that are null in the sparse vector representation of the query 402. By way of example and without limitation, the similarity comparison component 408 can determine that the sparse vector representation of the query 402 has null values for the second, third, and sixth dimensions. When the similarity comparison component 408 compares the query 402 with the items associated with cluster A 404, the similarity comparison component 408 can eliminate, or reduce a priority of, some items for comparison. By way of example and without limitation, item a3, as depicted in FIG. 4, only has a numerical value associated with the second dimension and because the sparse vector representation of the query 402 has a null value associated with the second dimension, the similarity comparison component 408 can omit, or reduce a priority of, the comparison between the query 402 and item a3. Additionally, item a4, as depicted in FIG. 4 has numerical values associated with the first, fourth, and fifth dimensions and because the sparse vector representation of the query 402 also has numerical values associated with these dimensions, the similarity comparison component 408 can prioritize the comparison between the query and item a4.

In some instances, the similarity comparison component 408 can reduce the number of comparisons required based on a computational resource constraint or a query result time constraint. By way of example and without limitation, the similarity comparison component 408 can receive an indication of an available amount of computational resources within a search system or a service level agreement associated with a query 402 indicating an amount of time allowed to provide a response to the query 402. In some instances, the similarity comparison component 408 can determine the amount of computational resources required or an amount of time required to provide query results based on, for example, a number of representative items and/or a number of items in a cluster associated with the representative items. Based on the resources available and/or the time allowed and the resources and/or time required, the similarity comparison component 408 can determine whether to perform additional comparisons between the query 402 and other representative items to provide more or less comprehensive results.

Figure 5:
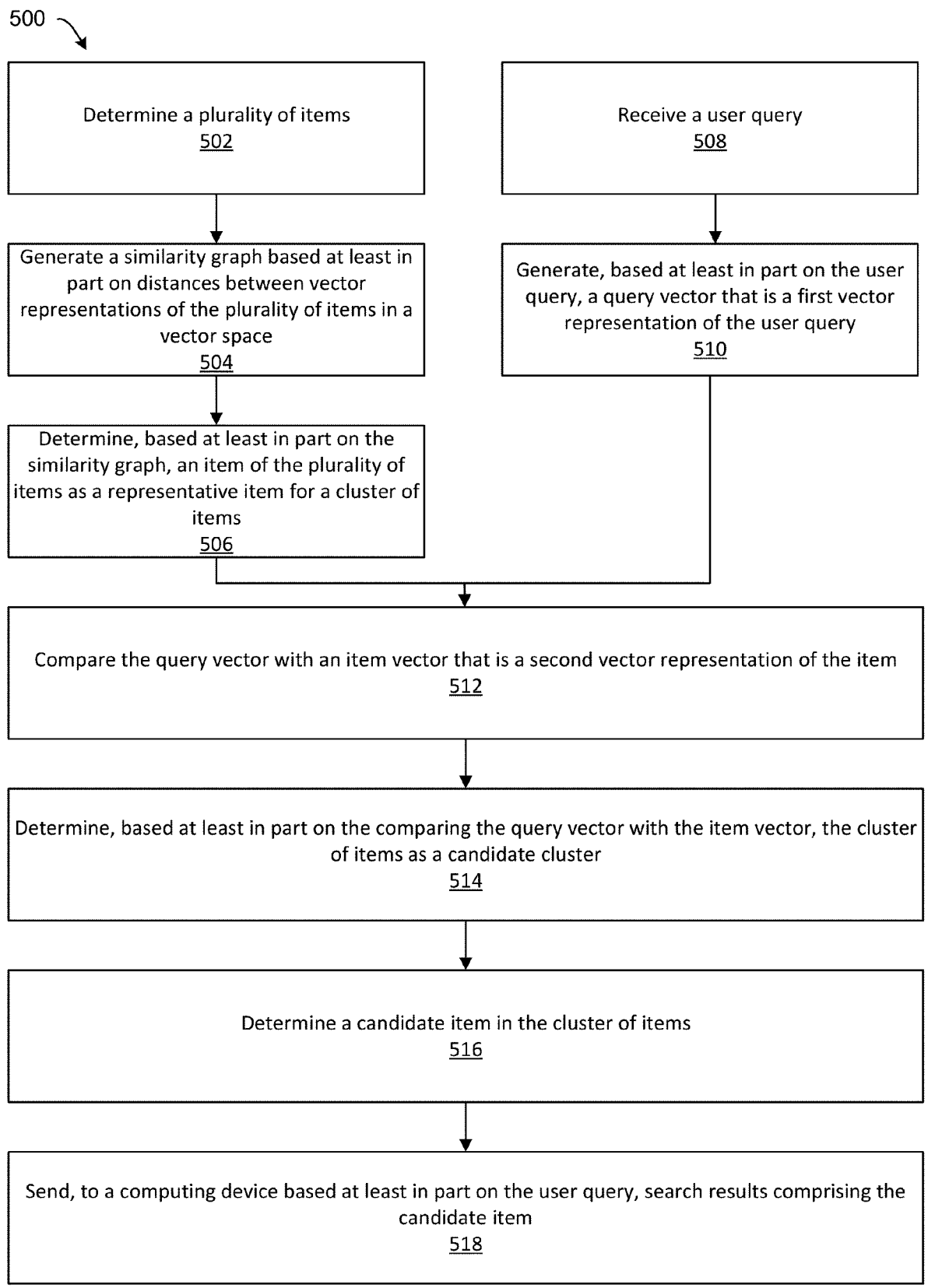
FIG. 5 is a flow diagram of an example process for sending search results to a user based on a query and a clustered catalog.

FIG. 5 is a flow diagram of an example process 500 for sending search results to a user based on a query and a clustered catalog.

At operation 502, the example process 500 can determine a plurality of items. In some instances, the plurality of items can be items in a catalog that are available for order by a user.

At operation 504, the example process 500 can generate a similarity graph based at least in part on distances between vector representations of the plurality of items in a vector space. In some instances, a search system can determine vector representations of some or all of the plurality of items in the catalog. The search system can, using a similarity function, determine a similarity between the plurality of times. If a similarity between two items meets or exceeds a similarity threshold (e.g., a distance threshold), the search system can establish a connection between the two items and, based on these connections, generate the similarity graph.

In some instances, the example process at operation 504 can include determining sparse vector representations of the plurality of items in the vector space. For example, a first item can be represented as a vector that includes numerical values associated with a set of dimensions (e.g., x associated with a first dimension, y associated with a second dimension, etc.). A second item can be represented as a vector that includes numerical values associated with a different set of dimensions. In order to ease a comparison between items, each item can be represented with a sparse vector representation that includes the same number of dimensions but includes null or 0 values for inapplicable dimensions. For example, a first item may not have a numerical value associated with a dimension that a second item does have. The sparse vector representation of the first item can include a null or 0 value for that dimension such that the set of dimensions between the first item and the second item are the same.

At operation 506, the example process 500 can determine, based at least in part on the similarity graph, an item of the plurality of items as a representative item for a cluster of items. In some instances, a selection algorithm can be used to identify an item as a representative item that has a maximum number of connected items connected to the item. In some instances, the selection algorithm can identify an item as a representative item based on the number of connected items meeting or exceeding a connection threshold.

At operation 508, the example process 500 can include receiving a user query. In some instances, a search system can receive the user query from a computing device associated with the user via a network. In some instances, the query can include natural language text.

At operation 510, the example process 500 can generate, based at least in part on the user query, a query vector that is a first vector representation of the user query. A search system can, based on the query, perform operations such as semantic analysis, rule-based systems, and/or machine-learned algorithms to determine a vector representation of the user query. In some instances, the query vector can be represented as a sparse query vector, which can, in some instances, ease comparison of the query vector with other vectors associated with items in a catalog.

At operation 512, the example process 500 can compare the query vector with an item vector that is a second vector representation of the item. In some instances, the example process 500 can use a similarity function to determine the similarity between the query vector and the item vector. In some instances, operation 512 can determine the dimensions in the query vector that are associated with numerical values and determine the dimensions in the item vector that are associated with numerical values. At operation 512, the example process 500 can determine, based on the dimensions of the query vector and the dimensions of the item vector, a number of matching dimensions and, in some instances, that the number of matching dimensions meets or exceeds a dimension threshold. Based on the number of matching dimensions, the operation 512 can determine to compare the query vector with the item vector.

At operation 514, the example process 500 can determine, based at least in part on comparing the query vector with the item vector, the cluster of items as a candidate cluster. In some instances, the example process 500 can use a similarity threshold to determine the cluster of items as the candidate cluster. By way of example and without limitation, comparing the query vector with the item vector can result in a similarity score. If the similarity score meets or exceeds the similarity threshold, then the cluster of items can be a candidate cluster.

At operation 516, the example process 500 can determine a candidate item in the cluster of items. Using a similarity function, the example process 500 can compare the query vector to the individual items in or associated with the cluster of items. If a similarity score between the query vector and an item of the cluster of items meet or exceeds a similarity threshold, then the item can be determined to be a candidate item. Similar to operation 512, the operation 516 can determine the dimensions associated with the query vector and the vector representations of the items in the cluster of items. In some instances, operation 516 can use the sparse vector representations to determine the matching dimensions to determine to compare the query vector with the vector representations of the items in the cluster of items.

At operation 518, the example process 500 can send, to a computing device and based at least in part on the user query, search results comprising the candidate item.

Figure 6:
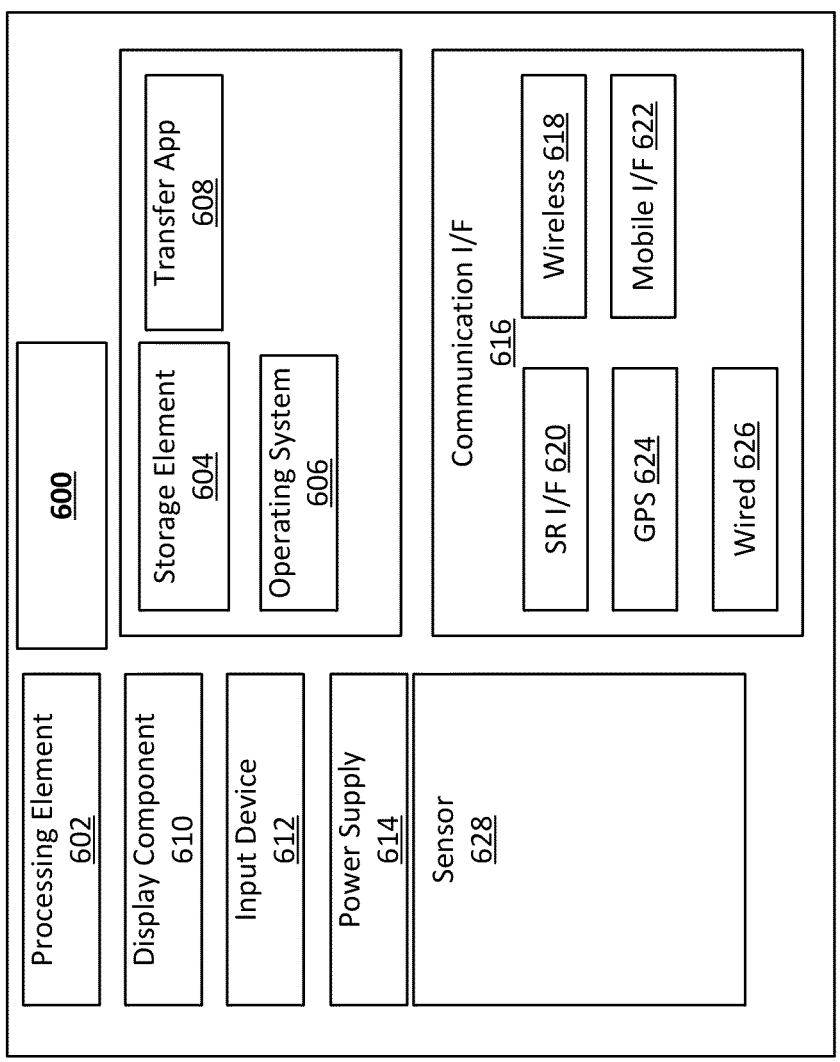
FIG. 6 is a system diagram of an illustrative computer architecture that can be used in accordance with various embodiments described herein.

FIG. 6 is a block diagram showing an example architecture 600 of a computing device used to at least partially implement a micro-partitioned based search system, in accordance with various aspects of the present disclosure. It will be appreciated that not all devices will include all of the components of the example architecture 600 and some user devices may include additional components not shown in the example architecture 600. In an example embodiment, the example architecture 600 includes one or more processing elements 602 for executing instructions and retrieving data stored in a storage element 604. The processing element 602 comprises at least one processor. Any suitable processor or processors may be used. For example, the processing element 602 may comprise one or more digital signal processors (DSPs). The storage element 604 can include one or more different types of memory, data storage, or computer-readable storage media devoted to different purposes within the example architecture 600. In an example embodiment, the storage element 604 comprises flash memory, random-access memory, disk-based storage, etc. Different portions of the storage element 604, for example, are used for program instructions for execution by the processing element 602, storage of images or other digital works, and/or a removable storage for transferring data to other devices, etc. Additionally, storage element 604 may store various costs, shards, parameters of machine learning models, vocabulary data structures, etc.

The storage element 604 may also store software for execution by the processing element 602. An operating system 606 may provide the user with an interface for operating the computing device and may facilitate communications and commands between applications executing on the example architecture 600 and various hardware thereof. In an example embodiment, a transfer application 608 is configured to receive images, audio, and/or video from another device (e.g., a mobile device, image capture device, and/or display device) included in the example architecture 600.

When implemented in some user devices, the example architecture 600 comprises a display component 610. The display component 610 can comprise one or more light-emitting diodes (LEDs) or other suitable display lamps. Also, in some examples, the display component 610 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 610 may be effective to display input images.

The example architecture 600 may also include one or more input devices 612 operable to receive inputs from a user. The one or more input devices 612 can include a push button, touch pad, touch screen, wheel, joystick, keyboard, mouse, trackball, keypad, light gun, game controller, or any other such device or element whereby a user can provide inputs to the example architecture 600. These input devices 612 may be incorporated into the example architecture 600 or operably coupled to the example architecture 600 via wired or wireless interface.

When the display component 610 includes a touch-sensitive display, the input devices 612 can include a touch sensor that operates in conjunction with the display component 610 to permit users to interact with the image displayed by the display component 610 using touch inputs (e.g., with a finger or stylus). The example architecture 600 may also include a power supply 614, such as a wired alternating current (AC) converter, a rechargeable battery operable to be recharged through conventional plug-in approaches, or through other approaches such as capacitive or inductive charging.

In an embodiment, the communication interface 616 comprises one or more wired or wireless components operable to communicate with one or more other computing devices. For example, the communication interface 616 may comprise a wireless communication module 618 configured to communicate on a network according to any suitable wireless protocol, such as IEEE 802.11 or another suitable wireless local area network (WLAN) protocol. In an embodiment, a short range interface 620 is configured to communicate using one or more short range wireless protocols such as, for example, near field communications (NFC), Bluetooth®, Bluetooth LE, etc. In an embodiment, a mobile interface 622 is configured to communicate utilizing a cellular or other mobile protocol. A Global Positioning System (GPS) interface 624 may be in communication with one or more earth-orbiting satellites or other suitable position-determining systems to identify a position of the example architecture 600. In an embodiment, a wired communication module 626 is configured to communicate according to the USB protocol or any other suitable protocol.

The example architecture 600 may also include one or more sensors 628 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the search system 110, as described herein, are exemplary, and may be located as a stand-alone device or may be included, in whole or in part, as a component of a larger device or system.

Figure 7:
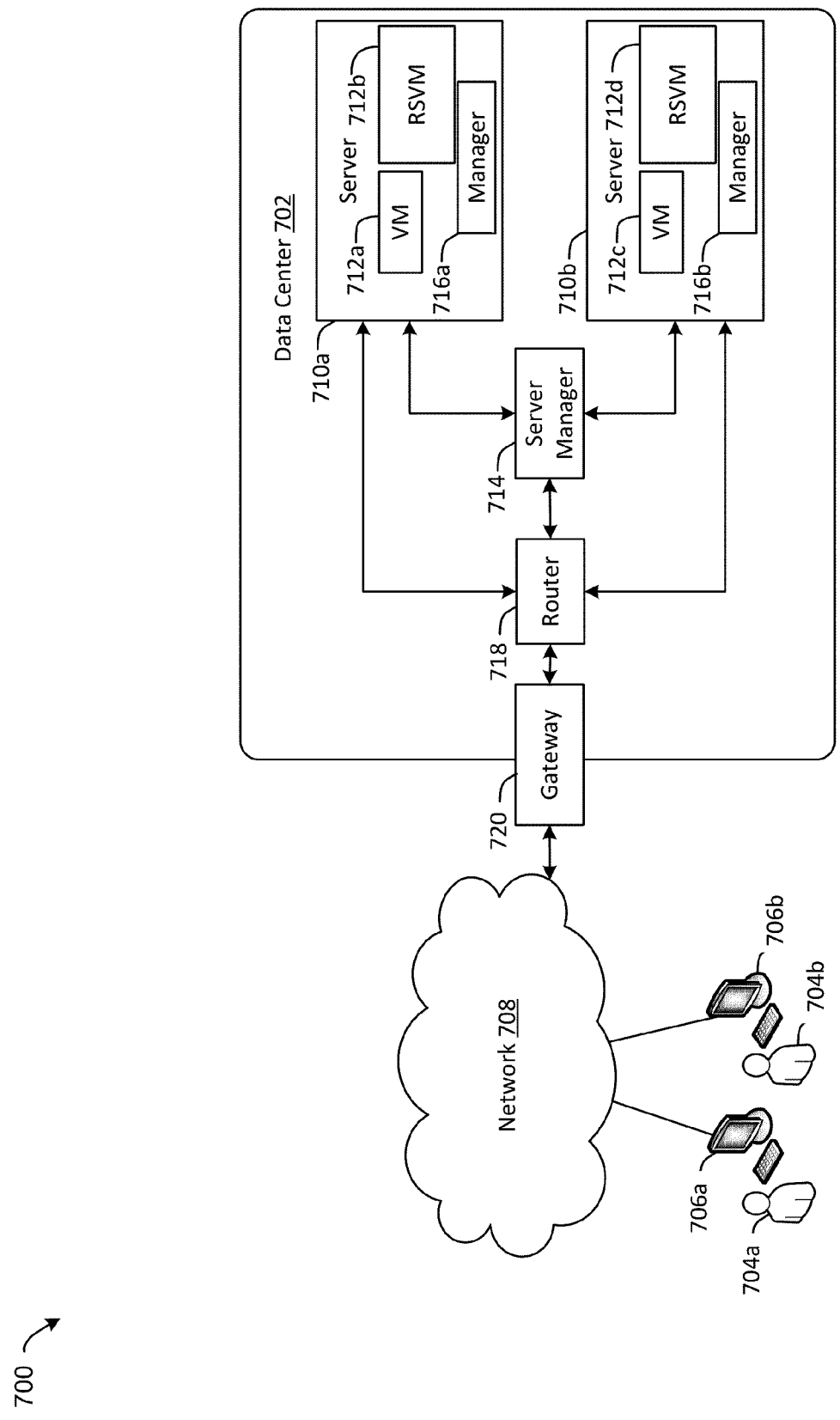
FIG. 7 is a diagram illustrating an example system for sending and providing data that may be used in accordance with the present disclosure.

An example system for sending and providing data and performing various computer processing techniques will now be described in detail. In particular, FIG. 7 illustrates an example computing environment 700 in which the embodiments described herein may be implemented. For example, the computing environment of FIG. 7 may be used to provide ranking of query results as a service over a network wherein one or more of the techniques described herein may be requested by a first computing device and may be performed by a different computing device configured in communication with the first computing device over a network. FIG. 7 is a diagram schematically illustrating an example of a data center 702 that can provide computing resources to users 704a and 706 (which may be referred herein singularly as user 704 or in the plural as users 704) via user computers 706a and 706b (which may be referred herein singularly as user computer 706 or in the plural as user computers 706) via network 708. Data center 702 may be configured to provide computing resources for executing applications on a permanent or an as-needed basis. The computing resources provided by data center 702 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the distributed search system 110, as described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/ or large storage capacity—and small resources—consisting of fewer processors, smaller amounts of memory and/or smaller storage capacity. Customers may choose to allocate a number of small processing resources as web servers and/ or one large processing resource as a database server, for example.

Data center 702 may include servers 710*a* and 710*b* (which may be referred herein singularly as server 710 or in the plural as servers 710) that provide computing resources. These resources may be available as bare metal resources or as virtual machine instances 712*a-d* (which may be referred herein singularly as virtual machine instance 712 or in the plural as virtual machine instances 712). In at least some examples, server manager 714 may control operation of and/or maintain servers 710. Virtual machine instances 712*c* and 712*d* are rendition switching virtual machine ("RSVM") instances. The RSVM virtual machine instances 712*c* and 712*d* may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 708 may, for example, be a publicly accessible network of linked networks and possibly operated by various distinct parties, such as the Internet. In other embodiments, network 708 may be a private network, such as a corporate or university network that is wholly or partially inaccessible to non-privileged users. In still other embodiments, network 708 may include one or more private networks with access to and/or from the Internet.

Network 708 may provide access to user computers 706. User computers 706 may be computers utilized by users 704 or other customers of data center 702. For instance, user computer 706*a* or 706*b* may be a server, a desktop or laptop personal computer, a tablet computer, a wireless telephone, a personal digital assistant (PDA), an e-book reader, a game console, a set-top box or any other computing device capable of accessing data center 702. User computer 706*a* or 706*b* may connect directly to the Internet (e.g., via a cable modem or a Digital Subscriber Line (DSL)). Although only two user computers 706*a* and 706*b* are depicted, it should be appreciated that there may be multiple user computers.

User computers 706 may also be utilized to configure aspects of the computing resources provided by data center 702. In this regard, data center 702 might provide a gateway or web interface through which aspects of its operation may be configured through the use of a web browser application program executing on user computer 706. Alternately, a stand-alone application program executing on user computer 706 might access an application programming interface (API) exposed by data center 702 for performing the configuration operations. Other mechanisms for configuring the operation of various web services available at data center 702 might also be utilized.

Servers 710 shown in FIG. 7 may be servers configured appropriately for providing the computing resources described above and may provide computing resources for executing one or more web services and/or applications. In one embodiment, the computing resources may be virtual machine instances 712. In the example of virtual machine instances, each of the servers 710 may be configured to execute an instance manager 716*a* or 716*b* (which may be referred herein singularly as instance manager 716 or in the plural as instance managers 716) capable of executing the virtual machine instances 712. The instance managers 716 may be a virtual machine monitor (VMM) or another type of program configured to enable the execution of virtual machine instances 712 on server 710, for example. As discussed above, each of the virtual machine instances 712 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 702 shown in FIG. 7, a router 718 may be utilized to interconnect the servers 710*a* and 710*b*. Router 718 may also be connected to gateway 720, which is connected to network 708. Router 718 may be connected to one or more load balancers, and alone or in combination may manage communications within networks in data center 702, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 702 shown in FIG. 7, a data center 702 is also employed to at least in part direct various communications to, from and/or between servers 710a and 710b. While FIG. 7 depicts router 718 positioned between gateway 720 and data center 702, this is merely an exemplary configuration. In some cases, for example, data center 702 may be positioned between gateway 720 and router 718. Data center 702 may, in some cases, examine portions of incoming communications from user computers 706 to determine one or more appropriate servers 710 to receive and/or process the incoming communications. Data center 702 may determine appropriate servers to receive and/or process the incoming communications based on factors such as an identity, location, or other attributes associated with user computers 706, a nature of a task with which the communications are associated, a priority of a task with which the communications are associated, a duration of a task with which the communications are associated, a size and/or estimated resource usage of a task with which the communications are associated and many other factors. Data center 702 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 702 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may, in some embodiments, be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems, systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
generating a similarity graph based at least in part on distances between vector representations of a first plurality of content items in a vector space;
determining, based at least in part on the similarity graph, a first content item of the first plurality of content items as a representative item for a cluster of content items;
receiving a user query;
generating, based at least in part on the user query, a query vector that is a first vector representation of the user query;
comparing the query vector with an item vector, wherein the item vector comprises a second vector representation of the first content item;
determining, based at least in part on the comparing the query vector with the item vector, the cluster of content items as a candidate cluster;
generating a sparse representation of the query vector, wherein the sparse representation comprises a dimension with a null or non-null value, wherein the generating expands the query vector and inserts at least one of a null or zero value for numerical values in the query vector representing a feature without equivalent in the item vector;
partitioning the cluster of content items based on non-null value associations with the dimension, wherein each of the content items in a first partition of the cluster of content items comprises a respective vector representation having a respective non-null value for a dimension;
determining a similarity value between the query vector and the respective vector representation of at least one of the content items in the first partition of the cluster of content items;
determining based upon the similarity value, a candidate item in the first partition of the cluster of content items; and sending, to a computing device based at least in part on the user query, search results comprising the candidate item.

2. The method of claim 1, wherein the cluster of content items comprises a second plurality of content items connected to the first content item in the similarity graph.

3. The method of claim 1, wherein generating the query vector comprises:
inputting the user query into a machine learned model; and
receiving, from the machine learned model, the query vector comprising a plurality of numeric values.

4. The method of claim 3, wherein the plurality of numeric values is a first plurality of numeric values, and generating the sparse representation of the query vector comprises:
inputting the query vector into the machine learned model; and
receiving, from the machine learned model, the sparse representation of the query vector comprising a second plurality of numeric values, the second plurality of numeric values comprising the first plurality of numeric values.

5. The method of claim 1, wherein the item vector is a first item vector, the method further comprising:
determining, based at least on the comparing the query vector with the first item vector, a first vector distance;
comparing the query vector with a second item vector; and
determining, based at least in part on the comparing the query vector with the second item vector, a second vector distance; and
wherein determining the cluster of items as the candidate cluster is based at least in part on determining that the first vector distance is less than the second vector distance.

6. The method of claim 5, wherein comparing the query vector with the second item vector is based at least in part on one of a computational resource constraint or a query result time constraint.

7. The method of claim 1, wherein the partitioning of the cluster of content items comprises:
determining a first non-null value of dimension of the sparse representation of the query vector;
determining that the candidate item comprises a non-null value for the dimension; and
determining the first partition including the candidate item.

8. The method of claim 1, wherein determining the candidate item in the first partition of the cluster of content items comprises:
comparing the query vector with a candidate vector that is a third vector representation of the candidate item;
determining, based at least on the comparing the query vector with the candidate vector, a vector distance; and
determining that the vector distance is less than a candidate distance threshold.

9. A non transitory computer readable medium storing instructions executable by a processor, wherein the instructions, when executed, cause the processor to perform operations:
generating a similarity graph based at least in part on distances between vector representations of a set of content items in a vector space;
determining, based at least in part on the similarity graph, a first content item of the set of content items as a representative item for a cluster of content items;
receiving a user query;
generating, based at least in part on the user query, a query vector that is a first vector representation of the user query;
comparing the query vector with an item vector, wherein the item vector comprises a second vector representation of the first content item;

determining, based at least in part on the comparing the query vector with the item vector, the cluster of content items as a candidate cluster;
generating a sparse representation of the query vector, wherein the sparse representation comprises a dimension with a null or non-null value, wherein the generating expands the query vector and inserts at least one of a null or zero value for numerical values in the query vector representing a feature without equivalent in the item vector;
partitioning the cluster of content items based on non-null value associations with the dimension, wherein each of the content items in a first partition of the cluster of content items comprises a respective vector representation having a respective non-null value for the dimension;
determining a similarity value between the query vector and the respective vector representation of at least one of the content items in the partition of the cluster of content items determining based upon the similarity value, a candidate item in the partition of the cluster of content items; and
sending, to a computing device based at least in part on the user query, search results comprising the candidate item.

10. The non transitory computer readable medium of claim 9, wherein the cluster of content items comprises a second set of content items connected to the first content item in the similarity graph.

11. The non transitory computer readable medium of claim 9, wherein generating the query vector comprises:
inputting the user query into a machine learned model; and
receiving, from the machine learned model, the query vector comprising a set of numeric values.

12. The non transitory computer readable medium of claim 11, wherein the set of numeric values is a first set of numeric values, and generating the sparse representation of the query vector comprises:
inputting the query vector into the machine learned model; and
receiving, from the machine learned model, the sparse representation of the query vector comprising a second set of numeric values, the second set of numeric values comprising the first set of numeric values.

13. The non transitory computer readable medium of claim 9, wherein the item vector is a first item vector, the operations further comprising:
determining, based at least on the comparing the query vector with the first item vector, a first vector distance;
comparing the query vector with a second item vector; and
determining, based at least in part on the comparing the query vector with the second item vector, a second vector distance; and
wherein determining the cluster of items as the candidate cluster is based at least in part on determining that the first vector distance is less than the second vector distance.

14. The non transitory computer readable medium of claim 13, wherein comparing the query vector with the second item vector is based at least in part on one of a computational resource constraint or a query result time constraint.

15. The non transitory computer readable medium of claim 9, wherein the partitioning of the cluster of content items comprises:
determining a first non-null value of the sparse representation of the query vector;
determining that the candidate item comprises a non-null value for the dimension; and
determining the first partition including the candidate item.

16. The non transitory computer readable medium of claim 9, wherein determining the candidate item in the first partition of the cluster of content items comprises:

comparing the query vector with a candidate vector that is a third vector representation of the candidate item;

determining, based at least on the comparing the query vector with the candidate vector, a vector distance; and determining that the vector distance is less than a candidate distance threshold.

17. A method comprising:

receiving a user query;

generating, based at least in part on the user query, a query vector that is a first vector representation of the user query;

comparing the query vector with an item vector, the item vector being a second vector representation of a representative item, wherein the representative item is representative of a cluster of items;

determining, based at least in part on the comparing the query vector with the item vector, the cluster of items as a candidate cluster;

generating a sparse representation of the query vector, wherein the sparse representation comprises a dimension with a null or non-null value, wherein the generating expands the query vector and inserts at least one of a null or zero value for numerical values in the query vector representing a feature without equivalent in the item vector;

partitioning the cluster of items based on non-null value associations with the dimension, wherein each of the items in the partition of the cluster of content items comprises a respective vector representation having a non-null value for the dimension;

determining a similarity value between the query vector and the respective vector representation of at least one of the content items in the partition of the cluster of content items determining based upon the similarity value, a candidate item in the partition of the cluster of items; and sending, to a computing device based at least in part on the user query, search results comprising the candidate item.

18. The method of claim 17, wherein the cluster of items comprises a first plurality of content items connected to the representative item in a similarity graph.

19. The method of claim 17, wherein generating the query vector comprises:

inputting the user query into a machine learned model; and receiving, from the machine learned model, the query vector comprising a plurality of numeric values.

20. The method of claim 19, wherein the plurality of numeric values is a first plurality of numeric values, and generating the sparse representation of the query vector comprises:

inputting the query vector into the machine learned model; and receiving, from the machine learned model, the sparse representation of the query vector comprising a second plurality of numeric values, the second plurality of numeric values comprising the first plurality of numeric values.

* * * * *